Dec. 29, 1925.
J. SLEPIAN
1,567,762
HIGH VOLTAGE PRODUCING MEANS
Filed August 8, 1919
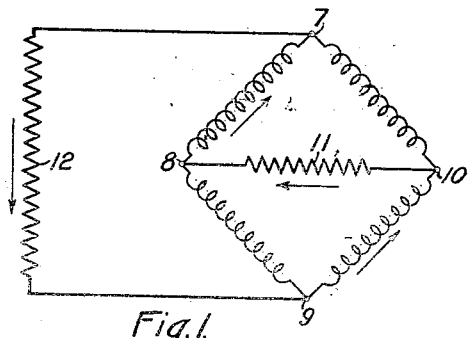
Fig. 1.
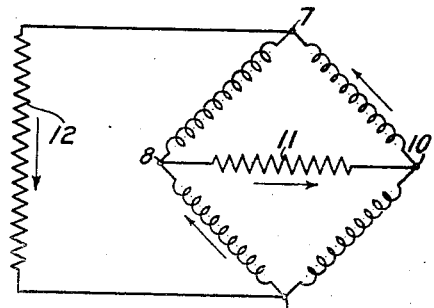
Fig. 2.
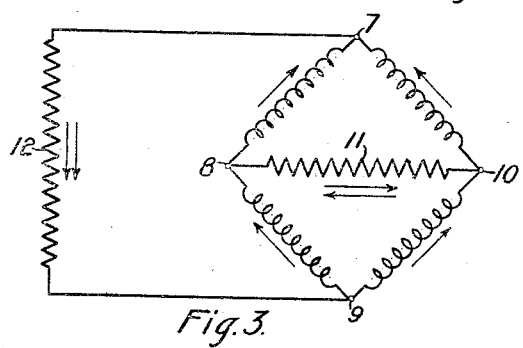
Fig. 3.
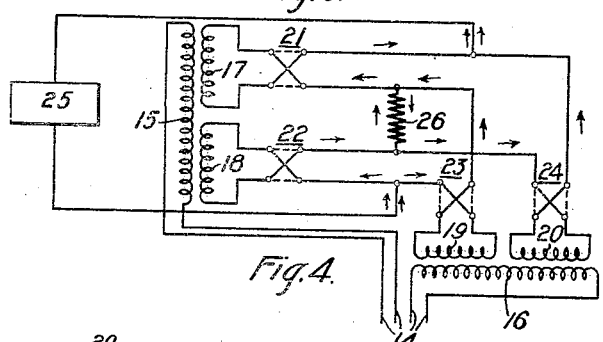
Fig. 4.
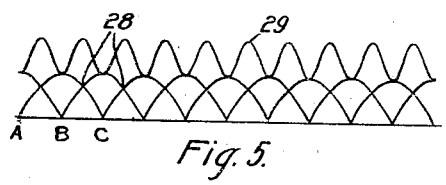
Fig. 5.
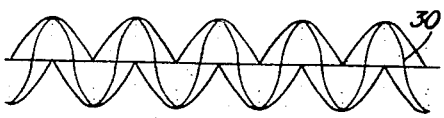
Fig. 6.
Fig. 7.
WITNESSES:
H.T. Shelhamer
D.C. Davis
INVENTOR
Joseph Slepian
BY
Wesley G. Carr
ATTORNEY Patented Dec. 29, 1925.   BEST AVAILABLE COPY   1,567,762

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

HIGH-VOLTAGE-PRODUCING MEANS.

Application filed August 8, 1919.   Serial No. 316,170.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in High-Voltage-Producing Means, of which the following is a specification.

My invention relates to means and apparatus for the production of unidirectional electromotive forces, preferably of high value, from alternating electromotive forces by the use of rectifying apparatus, and it has for its object to provide a system of the character designated that shall operate in a satisfactory manner, even at extremely high voltages, with little or no sparking.

In the accompanying drawing, Figs. 1, 2 and 3 are simplified diagrammatic sketches illustrative of a bridge system of the character employed by me; Fig. 4 is a diagrammatic showing of a rectifying system constructed in accordance with my invention and operating upon the principles illustrated in Figs. 1, 2 and 3; Figs. 5 and 6 are diagrams illustrative of the action of the system of Figs. 1 to 4, inclusive; and Fig. 7 is a similar view illustrating the effect of a flat-topped supply wave.

It has been proposed, in the past, to obtain high-voltage unidirectional electromotive forces by the rectification of polyphase electromotive forces, the different rectified polyphase waves overlapping to produce a substantially uniform output electromotive force, the magnitude of the ripples thereof decreasing with the number of phases rectified.

Systems of the foregoing character, as heretofore proposed, have involved the opening and closing of the rectifying circuits when considerable voltage was existing therein because of the fact that the load burden on a given alternating-current wave was removed soon after passing the crest of said wave and long before reaching zero thereof and was assumed by the next succeeding wave slightly before reaching the crest thereof. This making and breaking of the respective circuits under conditions of very appreciable voltage therein has inevitably led to sparking and other electrical difficulties.

In accordance with the present invention, I am enabled to rectify the current from a plurality of single-phase circuits and to combine the resultant rectified single-phase electromotive forces into a common load circuit, at the same time causing the circuit-opening-and-closing action in each single-phase circuit to take place only at the instant of zero voltage and zero current therein, thus largely doing away with sparking and other related rectifying difficulties.

In order to secure the foregoing result, I provide a resistor member of substantially the equivalent resistance of the load to which the rectified current is to be supplied and, assuming for simplicity, the use of quarter-phase currents for the energization of the system, I rectify currents and cause the resultant unidirectional current waves to flow additively through the load and to flow in opposition or differentially through the auxiliary resistor. A bridge is provided wherein two opposite sides are energized from one phase of the supply and the two remaining sides from the remaining phase, the load being connected across one diagonal and the auxiliary resistor being connected across the remaining diagonal.

By this arrangement, there is such shifting of the potentials as permits each current impulse, with its attendant electromotive force wave, to fall to zero before the circuit is interrupted and, in spite of the use of the auxiliary resistor, an energy loss of 20% or less is occasioned thereby; this loss being entirely permissible in many installations wherein the necessity for high-voltage unidirectional electromotive forces is extremely urgent, as, for example, in precipitation systems.

Referring to the drawing for a more detailed understanding of my invention, a bridge 7—8—9—10 is shown in Fig. 1, having a resistor 11 connected across one diagonal thereof and an equal resistor 12 connected across the remaining diagonal thereof. Assume now that the arms 7—8 and 9—10 are the seats of electromotive forces in the direction indicated by the adjacent arrows. Current flow takes place through the resistors 11 and 12 in the direction indicated and the points 7 and 10 are equipotential, as are also the points 8 and 9. Applying Kirchoff's first law, there is a rise of potential from 9 to 10, a corresponding fall of potential from 10 to 8, an equal rise of potential from 8 to 7 and a corresponding fall of potential through the resistor 12, the points 7 and 10 and the points 8 and 9 obviously being equi-potential, as this circuit is followed.

Referring now to Fig. 2, wherein the same bridge-and-resistor arrangement is shown, let the arms 7—10 and 8—9 be the seats of electromotive force in the direction indicated by the adjacent arrows. Current flow takes place through the resistors 11 and 12 in the direction indicated and the points 7 and 8, and the points 9 and 10 become equipotential with respect to this last-described current flow, for the same reasons as developed in connection with the system of Fig. 1.

Let it now be assumed that the conditions of Figs. 1 and 2 are coexistent, as indicated, for example, in Fig. 3. The two distinct current flows may each still be considered as taking place as before, in so far as the creation of equi-potential points is concerned, and it will be noted that the current flows attempting to take place in the resistor 11 are in opposition, whereas those taking place in the resistor 12 are additive.

Bearing the foregoing considerations in mind, attention is now directed to Fig. 4, illustrating a system constructed in accordance with my invention. Quarter-phase supply mains are shown at 14, energizing transformers 15 and 16, respectively, the transformer 15 having two secondary windings 17 and 18 and the transformer 16 also having two secondary windings 19 and 20.

Rectifying devices of any desired character are associated with each of the secondary windings 17 to 20, inclusive. These rectifying devices may be either of the mechanical, of the liquid or of the electronic type, as desired, the circuit connections being appropriately modified for each type of rectifier, as is well known in the art. As the specific type of rectifier employed forms no part of the present invention, I have illustrated it, in purely diagrammatic form, by devices 21 to 24, inclusive.

A load of any desired character that is to be energized with unidirectional current is shown at 25, and an equivalent resistor is shown at 26. The secondary windings 17 to 20, inclusive, together with their associated rectifying devices, are connected in a closed circuit by suitable leads in the following order 17—20—18—19—17, thus forming a bridge of the same character as indicated in Figs. 1 to 3, inclusive, the resistor 26 being connected across this bridge in the position shown by the element 11 in the simplified figures, and the load 25 corresponding to the element 12 in the simplified figures.

In the operation of a system thus shown, the single-phase electromotive forces generated in the secondary windings 17 and 18 and rendered unidirectional by the rectifying devices 21 and 22, respectively, appear as pulsating electromotive forces corresponding to those in the arms 7—8 and 9—10 in Fig. 1 and, in like manner, the single-phase electromotive forces of the secondary windings 19 and 20, rendered unidirectional by the rectifying devices 23 and 24 appear as pulsating electromotive forces corresponding to those in the arms 7—10 and 8—9 of Fig. 2. The resultant sets of pulsating waves flow through the system of Fig. 4 largely independent of each other, as described in connection with Fig. 3, combining additively in the load 25, as indicated at 29 in Fig. 5, and combining differentially in the resistor 26, as indicated in Fig. 6, in the latter case, producing a resultant small current flow which may be represented by the same curve as the differential voltage wave, as indicated by the line 30. It is thus seen that the differential voltage applied to the resistor 26 is not zero. The resistor serves as a by-pass for shunting the load current from the rectifying device which is undergoing commutation, so that the direct current of the load may remain substantially constant, while the several commuted currents may successively become zero. The energy loss because of the flow of this current through the resistor 26 is substantially 20% of the total energy of the system, with a sine wave of supply and is materially less than this percentage as the supply wave becomes of square top shape, as indicated in Fig. 7.

The operation of the device is as follows. At a given instant, indicated at A in Fig. 5, the current waves in coils 19 and 20 will be just starting to increase from zero value, with the left-hand terminals of the coils positive. At the same time, switches 23 and 24 will have just moved into the positions indicated by the full lines. In coils 17 and 18, however, the current will be just starting to decrease from maximum value, with the lower terminals of the coils positive. Switches 21 and 22 will be in the positions indicated by full lines. The current flow is indicated by the arrows.

A quarter of a cycle later, indicated at B in Fig. 5, the polarity of coils 17 and 18 will be reversing, switches 21 and 22 will be moving to dotted-line position, and the current will then continue to flow in the directions indicated by the arrows. At the end of another quarter of a cycle, indicated at C in Fig. 5, the polarity of coils 19 and 20 will be reversing, switches 23 and 24 will be moving to dotted-line position, and the current will then continue to flow in the directions indicated by the arrows. This operation is continued for each succeeding half wave, the switches 21, 22 and 23, 24 alternately changing positions at each succeeding quarter-cycle.

Particular emphasis is directed to the fact that, whereas the two groups of rectified waves co-operate in the energization of the load 25, they are, nevertheless, wholly independent of each other in their flow through the respective secondary windings and rectifying devices. Thus rather than having to, in effect, open and close the respective circuits at points such as 28—28 in Fig. 5, as is done in ordinary polyphase rectifying systems, each current wave is permitted to flow until its zero value is reached before rectification is necessary. Thus, the system is rendered commercially operable at voltages far in excess of those that may be employed with rectifying systems of ordinary character.

While I have shown my invention, for simplicity and clearness, as having a quarter-phase supply, it is nevertheless equally susceptible of application with any type of polyphase system.

While I have shown my invention in its preferred form, it will be obvious to those skilled in the art that it is not so limited but is susceptible of various minor changes and modifications without departing from the spirit thereof, and I desire, therefore, that only such limitations shall be placed thereupon as are imposed by the prior art or are specifically set forth in the appended claims.

I claim as my invention:

1. In a rectifying system, the combination with means for supplying two groups of electromotive forces of relatively displaced phase relation, of a common load means therefor, an auxiliary load means and means for causing the electromotive forces to be mutually additive in said common load means and to be mutually subtractive in said auxiliary load means.

2. In a rectifying system, the combination with a polyphase supply, of rectifying means for each phase of the supply, whereby differing systems of unidirectional current impulses are provided, and means for cumulatively combining said impulses in one portion of an electric circuit and for differentially combining said impulses in another portion of said circuit.

3. In a rectifying system, the combination with a polyphase supply, of rectifying means for each phase thereof, a load circuit including rectifying means of all of the different phases in series, and means for permitting each individual rectified impulse of the several phases to fall to zero current value, independent of the value of the total rectified current, before the reversal of the connections thereto.

4. In a rectifying system, the combination with a bridge, of a load connected across one diagonal thereof, an auxiliary impedance device connected across another diagonal thereof, means for producing unidirectional current impulses of like phase in two opposite arms of said bridge and means for producing unidirectional current impulses of like phase to each other but of displaced phase with respect to said first-mentioned impulses in the remaining two arms of said bridge, whereby said current impulses are cumulatively combined in said load circuit and differentially combined in said auxiliary impedance device.

5. In a rectifying system, the combination with means constituting a bridge, of a load circuit connected across one diagonal of said bridge, an auxiliary impedance device having an impedance equivalent to that of said load connected across the remaining diagonal of the bridge, means for producing similar cophasial unidirectional current impulses in oppositely disposed arms of said bridge, means for further producing similar current impulses of displaced phase with respect to said first mentioned impulses in the remaining arms of said bridge, all of said current impulses being similarly directed with respect to said load circuit, whereby the current impulses are cumulatively combined in the load circuit and differentially combined in the auxiliary impedance device.

6. In a rectifying system, the combination with a quarter-phase supply circuit, of two transformers arranged to have their primary windings energized from the phases thereof, respectively, each of said transformers having two secondary windings, current connections for forming a bridge from said secondary windings, the secondary windings associated with the respective phases alternating in said bridge, rectifying means associated with each of said secondary windings, a load circuit connected across one diagonal of said bridge and an auxiliary impedance device connected across the remaining diagonal of the bridge and having an impedance equivalent to that of said load circuit.

7. The method of rectifying polyphase currents which comprises individually rectifying each phase thereof, cumulatively combining the rectified impulses in the load and differentially combining said impulses in an auxiliary impedance device having an impedance equivalent to that of the load.

8. In a rectifying system, the combination with means for supplying two groups of electromotive forces of relatively displaced phase relation, of a common current path therefor and means for causing the electromotive forces to be mutually additive in one portion of said path and to be mutually subtractive in another portion of said path, said supply electromotive forces having a wave form differing from the sine wave.

9. In a rectifying system, the combination with means for supplying two groups of electromotive forces of relatively displaced phase relation, of a common current path therefor and means for causing the electromotive forces to be mutually additive in one portion of said path and to be mutually subtractive in another portion of said path, said supply electromotive forces having a flatter top wave form than the sine wave.

10. In a rectifying system, the combination with means for supplying two groups of electromotive forces of relatively displaced phase relation, of common current paths therefor and means for causing the electromotive forces to be mutually additive in one of said paths and to be mutually subtractive in another of said paths.

11. The combination with a direct-current system, of a polyphase system, current-interrupting means in each phase thereof, means for connecting said phases and interrupting means in proper direction to said direct-current system, and impedance means shunting said phases and interrupting means for periodically diverting the direct current through an impedance whereby the current in the respective phases may be substantially zero at the moments of interruption.

12. The combination with a polyphase system having an even number of phases, of means for connecting said phases in a quadrilateral bridge circuit, a direct-current line connected to diametrically opposite points in said bridge circuit, means for causing the alternating voltages of said phases to be applied always in the same direction in each half of said bridge circuit, whereby the two halves have a common positive terminal and a common negative terminal, and an alternating-current circuit connecting each of the remaining pairs of diametrically opposite points.

13. The combination with a polyphase system having an even number of phases, of means for connecting said phases in a quadrilateral bridge circuit, a direct-current line connected to diametrically opposite points in said bridge circuit, current-interrupting means for causing the alternating voltages of said phases to be applied always in the same direction in each half of said bridge circuit, whereby the two halves have a common positive terminal and a common negative terminal, and an alternating-current circuit connecting each of the remaining pairs of diametrically opposite points, said circuit carrying currents of such magnitude, frequency and wave-form that the current in each phase may be substantially zero at the moments of interruption.

14. The combination with a four-phase system, of means for connecting said phases in a quadrilateral bridge circuit, a direct-current line connected to diametrically opposite points in said bridge circuit, means for causing the alternating voltages of said phases to be applied always in the same direction in each half of said bridge circuit, whereby the two halves have a common positive terminal and a common negative terminal, and an alternating-current circuit joining an intermediate junction point between phases in one of said halves to an intermediate junction point between phases in the other of said halves.

15. The combination with a four-phase system, of means for connecting said phases in a quadrilateral bridge circuit, a direct-current line connected to diametrically opposite points in said bridge circuit, current-interrupting means for causing the alternating voltages of said phases to be applied always in the same direction in each half of said bridge circuit, whereby the two halves have a common positive terminal and a common negative terminal, and an alternating-current circuit joining an intermediate junction point between phases in one of said halves to an intermediate junction point between phases in the other of said halves, said circuit carrying currents of such magnitude, frequency and wave-form that the current in each phase may be substantially zero at the moments of interruption.

16. The combination with a four-phase system, of means for connecting said phases in a quadrilateral bridge circuit, current-interrupting means for causing the alternating voltage of said phases to be applied always in the same direction in each half of said circuit, whereby the two halves have a common positive terminal and a common negative terminal, and a resistor connected between an intermediate junction point between phases in one of said halves and an intermediate junction point between phases in the other of said halves.

17. The combination with a four-phase system, of means for connecting said phases in a quadrilateral bridge circuit, current-interrupting means for causing the alternating voltages of said phases to be applied always in the same direction in each half of said bridge circuit, whereby the two halves have a common positive terminal and a common negative terminal, a direct-current load connected between said positive and negative terminals, and an equivalent-resistance device connected between an intermediate junction point between phases in one of said halves and an intermediate junction point between phases in the other of said halves.

18. The combination with a polyphase system, of means for deriving a plurality of sources of electromotive forces from each phase of said system, means for connecting said sources in a plurality of parallel-connected series circuits, said series circuits each having one source from each of said phases, a direct-current line connected to said series circuits, means for causing the alternating voltages of said sources in each of said series circuits to be applied always in the same direction, and alternating-current circuit connections including impedance means connecting an intermediate junction point between phases in one of said series circuits to an intermediate junction point between phases in another of said series circuits, whereby differentially connected circuits are provided between the rectified currents from different phases.

19. The combination with a polyphase system, of means for deriving a plurality of sources of electromotive forces from each phase of said system, means for connecting said sources in a plurality of parallel-connected series circuits, said series circuits each having one source from each of said phases, a direct-current line connected to said series circuits, circuit-interrupting means for causing the alternating voltages of said sources in each of said series circuits to be applied always in the same direction, and alternating-current circuit connections ncluding impedance means connecting an intermediate junction point between phases in one of said series circuits to an intermediate junction point between phases in another of said series circuits, said alternating-current circuit connections comprising pairs of differentially connected phases, and said impedance means being of such nature as to draw currents necessary to permit the current in the respective sources to be substantially zero at the moments of interruption.

20. The combination with a two-phase system, of means for deriving two sources of electromotive forces from each phase of said system, means for connecting the four derived sources in a quadrilateral bridge circuit with the phases alternating, a direct-current line connected to diametrically opposite points in said bridge circuit, means for causing the alternating voltages of said sources to be applied always in the same direction in each half of said bridge circuit, whereby the two halves have a common positive terminal and a common negative terminal, and an alternating-current circuit connecting the remaining pair of diametrically opposite points of said bridge circuit.

21. The combination with a two-phase system, of means for deriving two sources of electromotive forces from each phase of said system, means for connecting the four derived sources in a quadrilateral bridge circuit with the phases alternating, a direct-current line connected to diametrically opposite points in said bridge circuit, current-interrupting means for causing the alternating voltages of said sources to be applied always in the same direction in each half of said bridge circuit, whereby the two halves have a common positive terminal and a common negative terminal, and alternating-current circuit connections including impedance means connecting the remaining pair of diametrically opposite points of said bridge circuit, said impedance means being of such nature as to draw currents necessary to permit the current in the respective sources to be substantially zero at the moments of interruption.

22. The combination with a two-phase system, of means for deriving two substantially equal sources of electromotive forces from each phase of said system, means for connecting the four derived sources in a quadrilateral bridge circuit with the phases alternating, a direct-current load connected to diametrically opposite points in said bridge circuit, means for causing the alternating voltages of said sources to be applied always in the same direction in each half of said bridge circuit, whereby the two halves have a common positive terminal and a common negative terminal, and alternating-current circuit connections including impedance means connecting the remaining pair of diametrically opposite points of said bridge circuit, said impedance means having the effect of a substantially ohmic impedance equal to the resistance of said load.

In testimony whereof, I have hereunto subscribed my name this 30th day of July, 1919.

JOSEPH SLEPIAN.